2 Sheets—Sheet 1.
AULTMAN & MILLER.
Mower.
No. 771.
Reissued July 19, 1859.
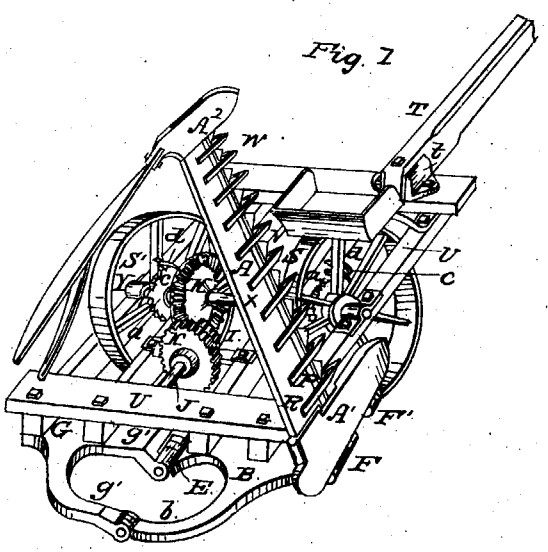
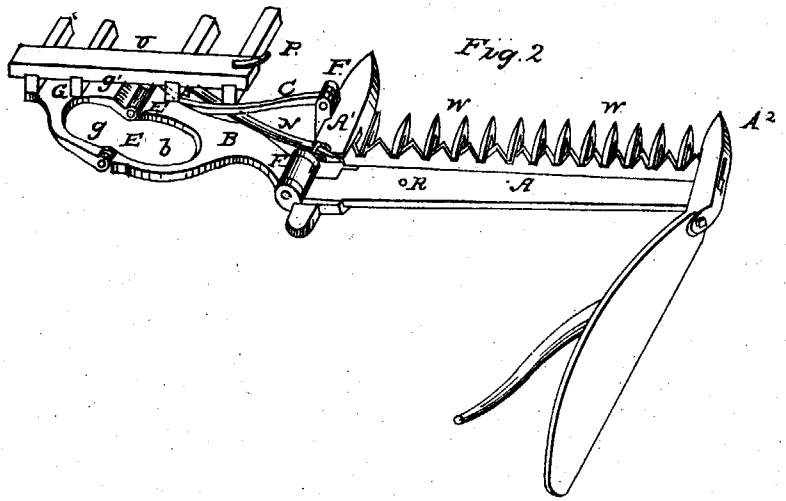
N. PETERS. Photo-Lithographer, Washington, D. C.

2 Sheets—Sheet 2.

AULTMAN & MILLER.

Mower.

No. 771. Reissued July 19, 1859.

N. PETERS, Photo-Lithographer, Washington, D. C.

UNITED STATES PATENT OFFICE.

C. AULTMAN AND LEWIS MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 171, dated July 19, 1859.

DIVISION A[2].

*To all whom it may concern:*

Be it known that we, CORNELIUS AULTMAN and LEWIS MILLER, both of Canton, in the county of Stark and State of Ohio, have invented an Improvement in Mowing-Machines, of which the following is a full, clear, and exact description, reference being had to the accompanying drawings, which make part of this specification, and in which—

Figure 5:
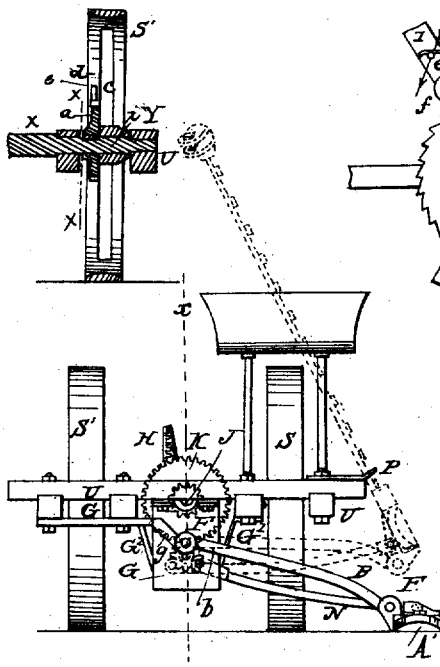
Figure 6:
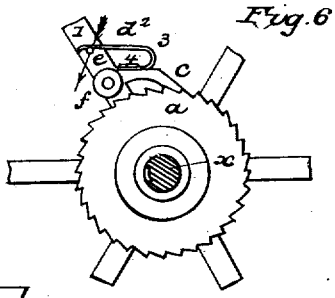
Figure 7:
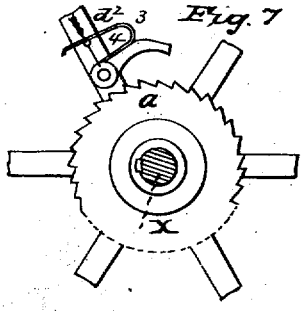
Figure 8:
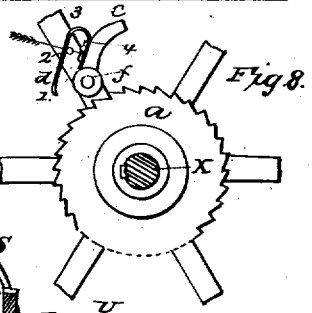
Figure 4:
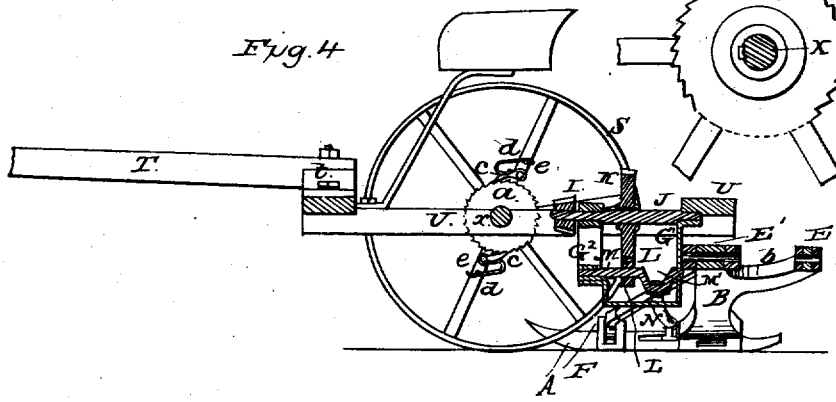

Figure 1 represents a view in perspective of a mowing-machine which embraces our improvements, the finger-beam and cutter being raised on end and leaned against the side of the frame to adapt the machine to being drawn to or from the place of mowing. Fig. 2 represents a like view of the rear portion of the machine, with the finger-beam extended upon the ground ready for mowing. Fig. 3 represents an elevation of the rear of the machine, showing particularly the relative positions of the parts when the finger-beam is down on the ground ready for work and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of those portions of the frame which are cut by the plane of the section through the wheel and axle. Fig. 6 represents a transverse section at the line *x x* of Fig. 5, and an elevation of the parts to the right of that line, except the frame and the rim and the outer ends of the spokes of the driving-wheels, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure. Fig. 8 represents the same view of the parts shown in Fig. 6, but with the spring and pawl in a third position different from those shown in Figs. 6 and 7.

We term that side of the machine the "right" side which would be at the right hand of a person behind the machine and looking toward it, and the opposite side of the machine we term its "left" side.

Many plans have been devised for connecting the finger-beams of mowing-machines to the car or main frame which carries the gearing in such manner as to allow it to slide on the surface of the ground and to rise and fall and sway up and down at either end to make the cutter conform to the varying inclinations of the ground, and thereby mow the grass more evenly on undulating ground than could be done if the upward, downward, and swaying movements of the finger-beam were more restrained.

To make the hinged connection of the finger-beam with the main frame sufficiently strong without either elongating the finger-beam or cramping its upward and downward movements or obstructing the passage of the cut grass over the finger-beam to the ground or interfering with the working of the cutter is the object of that branch of our invention which is the subject of this patent.

Before defining our invention more particularly we will premise that at the left end of the finger-beam there is a strong shoe or cross-head in the form of a sled-runner to which the finger-beam is firmly attached, and this shoe is hinged directly to the coupling-arm by a strong hinge; and our invention consists in combining with this shoe by which the finger-beam is carried a yielding brace-bar arranged in such manner that its axis of motion at the end next the main frame shall coincide with that of the coupling-arm, so that while the shoe is rising and falling it may not change its position laterally from the axis of motion of the coupling-arm, whether parallel or inclined thereto, or communicate lateral motion to the finger-beam, both of which it would do if the hinge of the brace-bar and that of the coupling-arm were not in line with each other. It is desirable to avoid such lateral movements, as they would interfere with the regularity of the cutting by sometimes pushing the finger-beam and cutter suddenly forward and greatly increasing the quantity of grass presented for severance by the stroke of the cutter then being made; at other times drawing them backward and greatly lessening the quantity of grass presented for severance by the stroke of the cutter at that time, and by these irregularities inducing great strains and often endangering the breaking of the machine.

The accompanying drawings represent a mowing-machine in which the main frame U is supported, like a cart, on two wheels, S and S′, and has a tongue, T, projecting from its front side, to which the team which draws the machine is harnessed in the usual manner.

The gearing derives its motion from one or both of the wheels S S′ and transmits it through a crank and connecting-rod to the cutter, which it vibrates.

To the under side of the rear portion of the main frame a strong bracket, G, is firmly secured. This bracket has two branches, *g g′*, one of which, *g′*, is jointed to the coupling-arm, B by a hinge, E′, and the other, *g*, is jointed to a brace, *b*, for supporting the coupling-arm, by a hinge, E. The right end of the coupling-arm is united by a hinge, F, to a shoe, A′, and this connection is strengthened by a brace, C, united at the right end to the forward part of the shoe A′ by a hinge, F′. The left end of the brace is attached to the left end of the coupling-arm B, close to the joint E′, so as to make the axis of motion both of that end of the arm and of that end of the brace which are attached to the main frame in the same line.

A strong and firm seat is formed in the shoe A′ for the reception of the left end of the finger-beam A, which is duly fitted to the seat and secured therein by means of bolts or other suitable fastenings. This mode of joining the shoe and finger-beam is more convenient than welding or casting them together.

The shoe can be made in the usual sled-runner shape to perform the duties of supporting the finger-beam and passing over obstructions in its path when the machine is at work. Any well-constructed mowing-machine with an unyielding finger-beam has a shoe such as we have described, and the shoe as ordinarily made for the performance of its ordinary functions has necessarily size and strength enough to support the hinges, and is fitted with a sufficient seat for the end of the finger-beam.

What we claim under this Patent as our invention is—

The combination of the shoe which carries the end of the finger-beam next the main frame with a hinged brace-bar whose axis of motion at the end connected to the main frame is in a line with that of the corresponding end of the hinged coupling-arm, substantially as herein set forth.

In testimony whereof we have hereunto subscribed our names.

CORNELIUS AULTMAN.
LEWIS MILLER.

Witnesses:
DANIEL TONNER,
FRED ORTH.